Dec. 12, 1939.    E. A. HESCHEL    2,182,922
METHOD OF PRODUCING A SOCKET WRENCH HEAD
Filed March 21, 1938    2 Sheets-Sheet 1
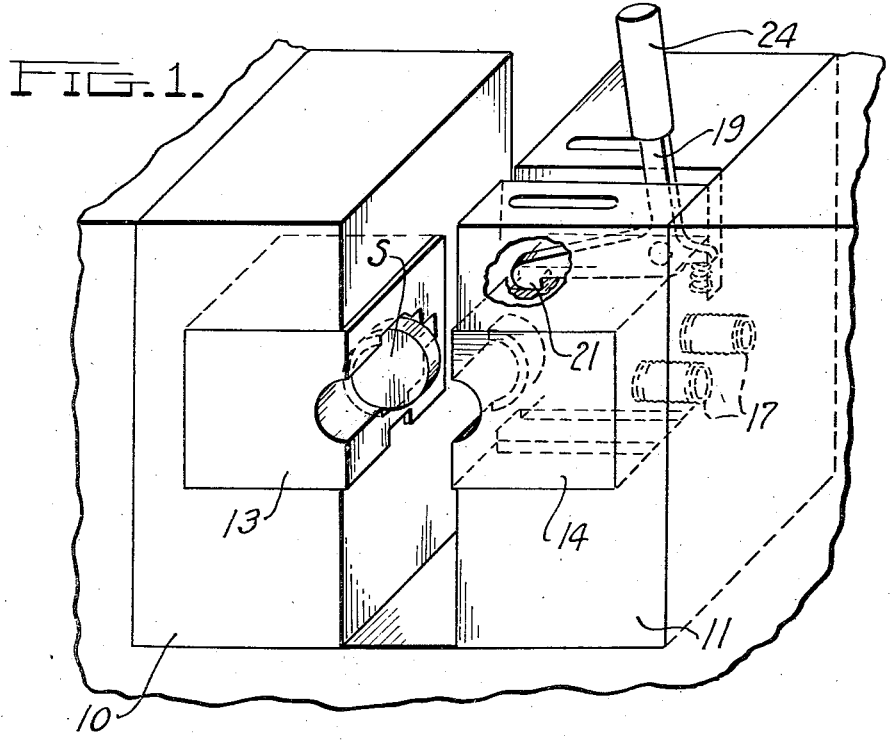
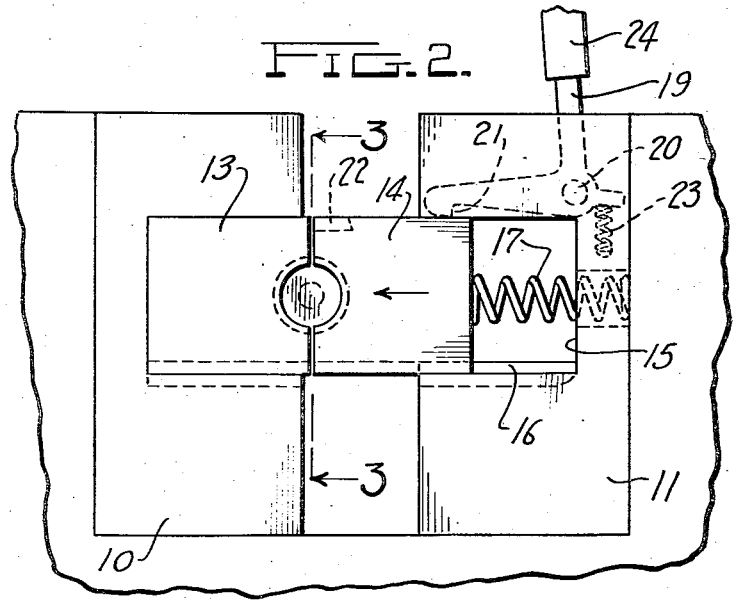
Inventor.
Eugene A. Heschel
By Malcolm W. Fraser
Attorney Dec. 12, 1939.  E. A. HESCHEL  2,182,922
METHOD OF PRODUCING A SOCKET WRENCH HEAD
Filed March 21, 1938  2 Sheets-Sheet 2
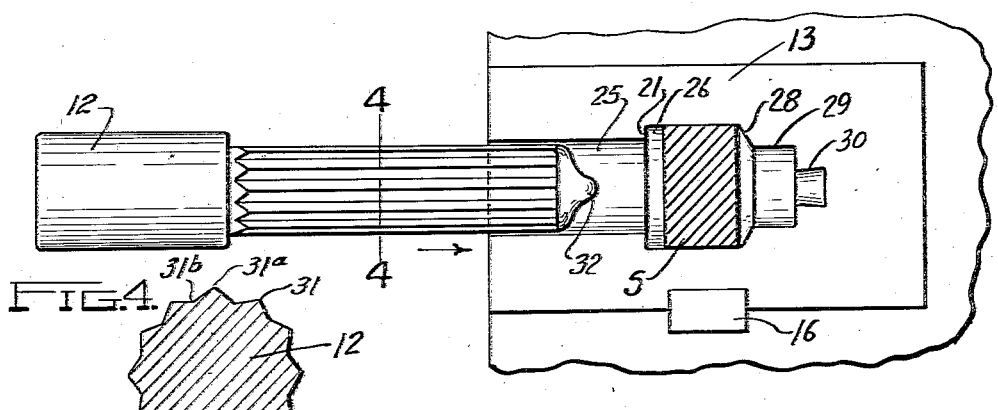
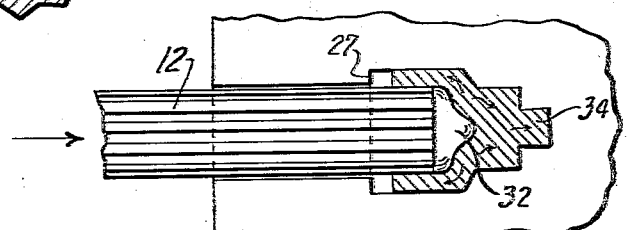
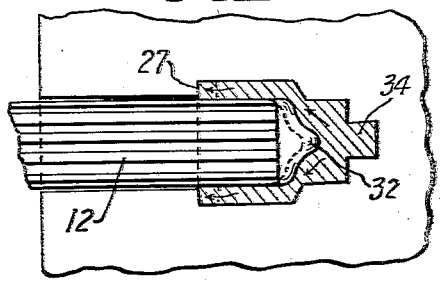
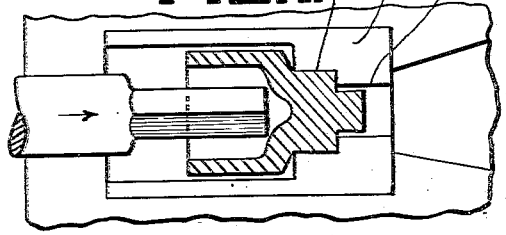
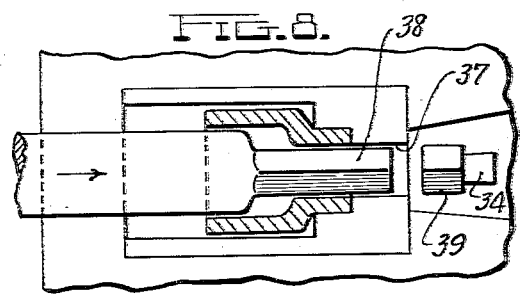
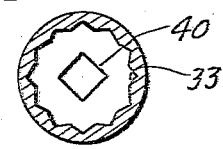
Inventor
Eugene A. Heschel
By Malcolm W. Fraser
Attorney Patented Dec. 12, 1939

2,182,922

UNITED STATES PATENT OFFICE 2,182,922

METHOD OF PRODUCING A SOCKET WRENCH HEAD

Eugene A. Heschel, Fremont, Ohio, assignor to The Herbrand Corporation, Fremont, Ohio, a corporation of Ohio Application March 21, 1938, Serial No. 197,146

4 Claims. (Cl. 76—114)

This invention relates to method of making forgings from billets or slugs which may be produced initially by cutting appropriate lengths from rods or in any convenient manner, the method by which the slugs are initially formed being immaterial so far as the present invention is concerned.

An important object of this invention is to produce an exceedingly simple, efficient and highly practical method of forging billets of greater diameter than thickness into cup-shaped articles, such, for example, as socket members for wrenches provided with internal longitudinal grooves, the construction and action of the dies being such that the slug is first held in position, then securely confined, whereupon by the action of the plunger the metal will be caused to flow rearwardly along the lines of least resistance and then forwardly in an axial direction.

According to this invention, articles of the above character can be produced at a considerable saving in time, labor and materials over methods heretofore employed. These articles have been formerly produced by screw machines or from bar stock which has been suitably gathered and pierced. As a result, the cost of making them has been extremely high but by means of this invention, these articles can be produced almost entirely from press forging operations and in their completed form possess superior characteristics but none of the disadvantages of methods heretofore used.

Although embodiment of the invention shown for purposes of illustration is a socket wrench head, it will be obvious that the method can be used in the production of various articles of cup shape, the die cavities and plunger being fashioned to suit the needs of the particular article being formed.

Further objects and advantages will appear as the description proceeds and for purposes of illustration but not of limitation, an embodiment of the invention is shown on the accompanying drawings in which—

Figure 1 is a front perspective view partly diagrammatic showing the die blocks and forging dies;

Figure 2 is a front end elevation showing the floating die in the position assumed after being released from its die block prior to the movement of the die blocks into juxtaposed relation;

Figure 3 is a vertical sectional elevation substantially on the line 3—3 of Figure 2 showing the piercing punch entering the forging dies;

Figure 4 is an enlarged transverse sectional view on the line 4—4 of Figure 3;

Figure 5 is a view somewhat similar to Figure 3 showing the piercing punch forcing the metal of the slug or billet forwardly;

Figure 6 is a view similar to Figure 5 but with the punch moved to its limit and showing the metal of the slug moved rearwardly and longitudinally of the punch thereby completely filling the cavity in the forging dies;

Figure 7 is a sectional elevation showing the socket wrench blank with the punch for punching out the sprue to make the desired hole in the socket wrench head;

Figure 8 is a view similar to Figure 7 but showing the punch having completed the punching operation to remove the sprue;

Figure 9 is a perspective view partly in section of the socket head blank with the sprue connected thereto;

Figure 10 is a perspective view partly in section showing the socket head after the sprue has been punched out; and Figure 11 is a transverse sectional view on the line 11—11 of Figure 10.

Referring to the drawings, 10 designates a stationary die carrying block and 11 designates a die carrying block which is movable laterally to and from the die block 10. The blocks 10 and 11 form a part of a forging machine such as is well-known in the trade so that description of the details of construction is not considered necessary. Suffice it to say that when the die blocks 10 and 11 have been brought together in order to close the forging dies, as will hereinafter appear, a piercing plunger 12 is forced into the dies to extrude the metal and after the plunger is withdrawn, the die blocks separate, the die block 11 moving laterally away from the die block 10.

Suitably secured to the stationary die block 10 is a die 13 with which cooperates a die 14 carried by the die block 11. Not only does the die 14 move with the die block 11 but it also can move relatively to the die block 11 toward and away from the die 13. For this purpose, the cavity 15 into which the die block 14 fits, is provided on its bottom wall with a key 16 fitting into a groove formed on the underside of the die 14 thereby to guide the movement of the die 14 toward and away from the die 13. The die 14 is urged toward the die 13 by a pair of helical coil springs 17 which bear at one end against the rear face of the die 14 and have their rear ends disposed in sockets 18 formed in the die block 11.

The die 14 is normally held within the cavity

2  2,182,922

15 by a substantially L-shaped trip arm 19 which is pivoted at 20 and has a hook end 21 for engagement in a notch 22 formed adjacent the outer end of the die 14. A coil spring 23 urges the trip arm 19 into engagement with the notch 12 and, if desired, a weight 24 may be so disposed as to urge the arm toward the die 14. Thus, in the normal position of the parts, the die 14 is retained within its cavity 15 as shown in Figure 1 and by rocking the trip arm 19 in a clockwise direction, the die 14 is released and the springs 17 urge it toward the die 13. By enabling the die 14 to float relatively to the die block 11, the slug or billet from which the socket wrench head is formed may be initially placed between the dies 13 and 14 and then by actuation of the lever 19, the die 14 is abruptly moved against the slug to hold it in position. This enables the operator to remove the pinchers prior to the forging operation as will hereinafter appear.

As shown on Figure 3, the mating cavities of the dies 13 and 14 provide a lateral opening 25 of a size just sufficient to provide a nice fit for the working end of the piercing plunger 12. The opening 25 terminates in a cylindrical cavity 26 which is of greater diameter than the diameter of the piercing plunger but co-axial with the plunger so that the wall thickness of the socket wrench head is the distance between the outer surface of the piercing plunger and the wall of the cavity 26. It should be noted that an annular shoulder 27 is provided at the rear end of the cavity 26 and this is of importance in retaining the blank within the die when the piercing plunger 12 is retracted or withdrawn. The forward end of the annular cavity 26 tapers inwardly as indicated at 28 to a reduced neck 29 and from the center of the forward end of the neck 29 extends a relatively small annular cavity 30.

It will be observed that the working end of the piercing plunger 12 is formed with an annular row of ribs or flutes 31 forming alternately longitudinal teeth 31a and grooves 31b, the extreme end of the plunger having a relatively blunt point 32. From the point 32 the surface curves inwardly and then outwardly substantially in the form of an ogee curve.

The slug or billet S is in the form of an annular disc of greater diameter than thickness and of diameter substantially that of the cavity 26 when the dies 13 and 14 are brought together. It should be noted that the thickness of the slug S is somewhat less than the length of the cavity 26 as clearly shown on Figure 3 and when the slug is placed between the dies, it should be disposed as illustrated on Figure 3 with the forward end abutting against the edge of the annular tapered portion 28. As above pointed out, the slug S is first heated to the desired degree and the operator places it between the dies 13 and 14 whereupon the weighted handle 24 of the trip lever 19 is released to allow the die 14 to move toward the die 13 to grip the slug S in position. Thereafter, the machine is started, whereupon the die block 11 moves into engagement with the die block 10 so that the mating cavities of the dies 13 and 14 close together. Thereupon, the piercing plunger 12 is forced through the opening 25 into engagement with the rear face of the slug S and thereupon the metal of the slug S, moving along the lines of least resistance, fills the portions 28, 29, and 30 of the cavity as illustrated in Figure 5. Upon further continuous movement of the plunger 12, the metal of the slug S, taking somewhat of a rolling motion in view of the contour of the end of the plunger, is extruded rearwardly longitudinally of the plunger as indicated by the arrows on Figure 6 into abutting relation with the shoulder 27. Thereupon, the plunger 12 has accomplished its work and retracts in a rearward direction. The blank is securely held within the dies by the shoulder 27 so that, although the plunger is permitted to retract, the blank remains in position.

The forging machine automatically operates to move the die 11 away from the die 10 but since the hooked end 21 of the trip lever 19 has engaged in the notch 22 when the die blocks are moved together, it will be evident that when the die block 11 moves away from the block 10, the die 14 moves along with it. Thus the trip lever automatically operates to connect the die 14 and block 11 so that when the latter retracts, the die 14 is forced to move with it.

When the above operation is completed, the blank takes the form shown on Figure 9, the flutes or ribs 33 having been formed therein and the thickness of the walls being uniform throughout. The extension 34 or sprue provides a projection which can be engaged by pinchers so as not to distort in any manner the contour of the blank. Thus, it will be apparent that after the die blocks separate, the operator with the aid of pinchers grasps the sprue 34 and places the blank in a die 35 which embraces only the reduced neck 36 of the blank. This die is formed with an opening 37 slightly larger than the diameter of the sprue 34 and square in order to accommodate the punch 38 which is square in cross section. The punch 38 as illustrated in Figures 7 and 8 punches out the sprue 34 and a portion 39 from the blank, thereby forming a square hole 40 in the neck 36. Thereupon, the socket wrench head is completed, except for minor grinding and polishing operations. It will be understood that the usual adapter fits into the hole 40 for operating the wrench head in the usual manner.

From the above description, it will be apparent that socket wrench heads can be produced efficiently and economically, constituting a saving of over half the material ordinarily used and greatly reducing the amount of time heretofore necessary to form a head of this character. Not only does it result in a material saving in cost, but a superior product of uniformly high quality is obtained, the wall thickness at all times being the same.

Although I have described my invention in connection with socket wrench heads, it is to be understood that the method can be employed to advantage in forming other articles of similar shape. It is, therefore, to be understood that variations in the particular nature of the steps of this invention, either in the process or in the use of an apparatus of different form, may be employed without departing from the spirit of my invention, especially as defined in the appended claims.

What is claimed is:

1. The method of forging a socket wrench head which consists in confining a heated solid billet within dies against lateral flow but permitting longitudinal flow in both directions, forcing a plunger provided with an annular row of alternating longitudinal teeth and grooves into the billet to cause the metal to flow first ahead of the plunger to fill the cavity and provide an external sprue and then to flow longitudinally along the plunger until it abuts a shoulder on the dies, withdrawing the plunger, the blank being retained by the shoulder, separating the dies, gripping the sprue and introducing the blank into another die, and punching out the sprue to form a hole.

2. The method of forging a socket wrench head which consists in confining a heated solid billet within dies which will permit longitudinal flow in both directions, forcing a plunger into the billet to cause the metal to flow first ahead of the plunger to fill the die cavity and provide an external sprue and then to flow longitudinally along the plunger until it abuts a shoulder on the dies, withdrawing the plunger, the blank being retained by the shoulder, separating the dies, gripping the sprue and introducing the blank into another die, and punching out the sprue to form a hole.

3. The method of forging a socket wrench head which consists in confining a heated solid billet within dies which will permit longitudinal flow in both directions, forcing a plunger, having a cross-sectional shape corresponding with the desired internal shape of the portion of the socket wrench head which is formed by said plunger, into the billet to cause the metal to flow first ahead of the plunger to fill the cavity and provide an external sprue, and then to flow longitudinally along the plunger until it abuts a shoulder on the dies, withdrawing the plunger, the blank being retained by the shoulder, separating the dies, gripping the sprue and introducing the blank into another die, and punching out the sprue to form a hole.

4. The method of forming a socket wrench head which consists in confining a heated solid billet within dies which will permit longitudinal flow in both directions, forcing a plunger, having a cross-sectional shape corresponding with the desired internal shape of the portion of the socket wrench head which is formed by said plunger, into the billet to cause the metal to flow first ahead of the plunger to fill the die cavity and provide an external sprue and then to flow longitudinally along the plunger until it abuts a shoulder of the dies, withdrawing the plunger, and finally punching out the sprue to form a hole.

EUGENE A. HESCHEL.